United States Patent [19]
Kurihara et al.

[11] Patent Number: 5,382,773
[45] Date of Patent: Jan. 17, 1995

[54] APPARATUS AND METHOD FOR FABRICATING A PERFORATED WEB BY LIGHT

[75] Inventors: Kazuhiko Kurihara, Tokyo; Hiroshi Yazawa, Kunitachi; Shoichi Yazawa, Kamiina; Yuki Kuroiwa, Nizza; Shuichi Murakami, Tokyo, all of Japan

[73] Assignees: Nippon Petrochemicals Company, Limited; Polymer Processing Research Institute, Ltd., Tokyo, Japan

[21] Appl. No.: 996,562

[22] Filed: Dec. 24, 1992

[30] Foreign Application Priority Data

Dec. 27, 1991 [JP]  Japan .................................. 3-361472
Sep. 1, 1992 [JP]  Japan .................................. 4-274777

[51] Int. Cl.⁶ ............................................ B23K 26/00
[52] U.S. Cl. ............................ 219/121.7; 219/121.74; 219/121.82
[58] Field of Search ................. 219/121.74, 121.82, 219/121.7, 121.71

[56] References Cited

U.S. PATENT DOCUMENTS 4,302,654  11/1981  Bennet et al. .
4,507,535  3/1985  Bennette et al. ............... 219/121.71

FOREIGN PATENT DOCUMENTS 0281686  9/1988  European Pat. Off. .
58-15232  3/1983  Japan .
1-46236  10/1989  Japan .
3-54053  8/1991  Japan .

*Primary Examiner*—C. L. Albritton
*Attorney, Agent, or Firm*—Burns, Doane, Swecker & Mathis

[57] ABSTRACT

An apparatus for fabricating a perforated web comprising an endless masking plate arranged above a continuously conveyed web. The masking plate has a plurality of apertures arranged in a predetermined pattern, the masking plate being adapted so as to be continuously circulated. The light is irradiated to the web via the masking plate so that apertures or slits are formed in the web corresponding to the apertures of the masking plate. The light may be a laser, an infrared light, or an ultraviolet light, and the light from the source is diverged transversely about the web and converged longitudinally about the web.

26 Claims, 19 Drawing Sheets

APPARATUS AND METHOD FOR FABRICATING A PERFORATED WEB BY LIGHT

BACKGROUND OF THE INVENTION

1. Field of the Invention

The present invention relates to an apparatus for fabricating a perforated web by a light, and in particular, the present invention relates to an apparatus and a method for continuously forming apertures or slits in a moving web by the energy of a light.

2. Description of the Related Art

There are known apparatuses and methods for forming apertures or slits in a continuously moving web using razor edges, needles, or rotatable blades (cf, for example, Japanese Examined Patent Publication (Kokoku) No. 60-37786 filed by the inventors of this application). The method of forming apertures or slits in a wide web using a sharp cutting edge has a shortcoming in that the life of the cutting edge is short due to wear thereof and it is difficult to accurately arrange a plurality of cutting edges in position. Apparatuses and methods for forming apertures or slits in a continuously moving web using hot cutting edges to melt the web (cf, for example, Japanese Examined Patent Publication (Kokoku) No. 61-11757) are also known. The method of forming apertures or slits using heat has a problem in that margins of apertures or slits melt to a greater extent and the shape of the margins is not clear, in addition to the above described problem concerning the cutting edges. Denaturalization of the margins of apertures or slits is not preferable when the resultant perforated web is to be subsequently stretched.

Laser techniques are being developed and used in a variety of fields, and heat energy is being used for cutting with the development of carbon dioxide lasers or YAG (yttrium, aluminum and garnet) lasers. The conventional cutting method using the laser beam is to continuously cut a web longitudinally, or to perforate holes regularly along the length of the web (cf, for example, Japanese Examined Patent Publication (Kokoku) No. 1-46236). Also, laser beams are used for engraving or forming holes in wood or plastic plates, using a masking plate of a predetermined size (cf, for example, Japanese Unexamined Patent Publication (Kokai) No. 58-15232). Also, as an example of a laser beam applied to a moving web, the use of heat energy of a laser beam for drying the web (cf, for example, Japanese Examined Patent Publication (Kokoku) No. 3-54053) is known.

Heat energy of the laser beam is also used to dry paintings or to weld plates by concentrating the laser beam at a point. However, the laser beam is not used for perforating a moving web since it is difficult to concentrate the laser beam at a point on the moving web, and the power of the laser beam is insufficient. Also, ultraviolet light such as used in an eximer laser is used for precision procedures in semiconductor devices, but perforating a moving web using ultraviolet light is not known.

The present invention is directed to an apparatus and a method for continuously perforating a moving web using a light such as a laser beam, infrared light, or ultraviolet light.

In the prior art, it is not possible to continuously form a plurality of discontinuous holes in a moving web having a width in a non-contact manner and at an economical speed, and though there has been a demand for continuously forming a plurality of holes along the width of a web using a masking plate, it has not been possible to continuously form a plurality of holes in the moving web because the masking plate of a predetermined size in the prior art cannot follow the moving web.

Recently, in the field of non-woven fabrics, a large amount of cross-laminated non-woven fabric comprising a warp web and a weft web have been manufactured. The warp web is fabricated by forming slits in a web so that the slits extend longitudinally about the web and by stretching the web in the direction of the slits; the weft web is fabricated by forming slits in a web so that the slits extend transversely about the web and by stretching the web in the direction of the slits; and the warp and weft webs are laminated one above the other so that the stretching directions are held crosswise to each other. Also, a reinforced film, in which a film is stretched uniaxially or biaxially and the stretched film is perforated, is used in a variety of fields.

SUMMARY OF THE INVENTION

The object of the present invention is to provide an apparatus for fabricating a perforated web using a light, by which apertures or slits are clearly formed in the intended shape and the film is not affected during the perforating step.

According to the present invention, there is provided an apparatus for fabricating a perforated web comprising a conveying means for conveying a web along a predetermined path and in a predetermined direction, the web having a longitudinal direction in correspondence with the conveying direction and width; an endless masking plate arranged along the predetermined path and having a plurality of apertures arranged in a predetermined pattern, the masking plate being adapted so as to continuously circulate around a fixed point; a source of light; and an optical means for directing the light from the source to masking plate for forming apertures in the web.

This is called the system M hereinafter.

Preferably, the optical means includes a first optical means for diverging the light from the source transversely about the web and/or a second optical means for converging the light from the source longitudinally about the web. Preferably, the optical means includes a third optical means arranged between the second optical means and the masking plate for gathering the light.

The optical means can be arranged so that the light impinges upon the masking plate at an area having a width corresponding to the width of the web (called the system M-1). Also, the optical means can be arranged so that the light impinges upon the masking plate at an area having a width smaller than the width of the web (called the system M-2). In the latter case, the optical means includes a traversing means for traversing the light transversely about the masking plate.

Preferably, the masking plate is supported at one side thereof by a rotatable body, and at least a part of the optical means is stationary and arranged within the masking plate, the light from the source being passed from the other side of the masking plate to at least a part of the optical means in the masking plate and to the masking plate. In this case, the rotatable body is preferably supported on a stationary shaft by a bearing, the stationary shaft extending in the mask plate and supporting at least a part of the optical means.

In another aspect of the present invention, there is provided a method for fabricating a perforated web comprising the steps of: conveying a web along a predetermined path and in a predetermined direction; and irradiating the web with a convergent light moving transversely about the web so that the light intermittently impinges upon the web.

This is called the system N hereinafter.

Preferably, the irradiating step is carried out by at least one of the following steps: reflecting the light at an oscillating mirror, reflecting the light at a polygonal mirror, reflecting the light at a mirror moving transversely about the web, guiding the light in at least one flexible means moving transversely about the web, and reflecting the light at a plurality of mirrors attached to a rotatable body at different angles.

In still another aspect of the present invention, there is provided a method for fabricating a perforated web comprising the steps of: printing a material having a light absorbing property to a light transparent web in a predetermined pattern; and irradiating the continuously moving web with a light.

This is called the system P hereinafter.

The light used in the systems M and P is preferably divergent and the source of light may comprise a plurality of elements emitting divergent light, respectively, to cover the width of the web. In the system N, a beam diameter is narrowed as small as possible, for example, several tens to one hundred of microns in the case of a laser beam. A plurality of such beams are used together to increase the efficiency of the operation.

The source of light may be a source of infrared light, and in this case, a conventionally available halogen lamp may be preferable for a light having high energy. A usual halogen lamp emits a light in the bandwidth of a wavelength having a peak near 1 micron, which is scarcely absorbed in a polymer material, but it has been found that when a halogen lamp is controlled to emit a light of approximately 700° C. the peak of the wavelength thereof becomes approximately 3.5 microns and the energy of such a light is effectively absorbed in a polymer material having a C—C bond. It is also possible to use a light of medium or long wavelength (a far infrared light) longer than that of the infrared light, using a ceramic heater or the like. The infrared light is thus advantageous since a major wavelength can be selectively used. It is also possible to turn off an unnecessary wavelength component using a filter.

It is possible to use the heat energy of a combustion gas or an electric heater as a source of infrared light, as well as an infrared heater or an infrared lamp. The infrared light emitting device is cheaper, easier to handle, and has a larger energy effect than a laser emitting device. Also, it is possible to provide a linearly patterned light or a spot light.

It is also possible to use a gas laser such as a carbon dioxide laser or a carbon monoxide laser, a solid laser such as YAG (ytrium, aluminum and garnet) laser, or a liquid laser. Since the laser has a single wavelength, it is preferable in the system N in which converged light is used. The wavelength of the carbon dioxide laser is 10.6 microns and the wavelength of the YAG laser is 1.06 microns, these lasers being preferable in the systems M and N for perforating a web that absorbs a light of such wavelength. If a web does not absorb a laser beam, the system P is preferable. The laser emitting device is preferably a high or low speed axial flow type but in many cases, a low speed axial flow type provides a stably divergent light.

It is also possible to use an ultraviolet light as a source of light for the present invention. The infrared heater or the infrared laser functions based on heat energy but the ultraviolet light functions base on a chemical action that severs or denatures molecular chains. Therefore, it is sufficient that apertures not be opened at the time when the ultraviolet light irradiates the web but the apertures be subsequently opened at the time the web is stretched. It is possible for the ultraviolet light alone to irradiate the web but the ultraviolet light should be used in combination with the laser or the infrared heater so that the ultraviolet light first severs molecular chains thereby denaturing the web and subsequently the infrared light irradiates the web to effectively form holes thereat.

The ultraviolet light has a shorter wavelength and it is convenient to concentrate the ultraviolet light at a specific spot or form precise holes.

It is also possible to use an eximer laser, a mercury lamp, a metal halide lamp, or an xenon lamp as a source of ultraviolet light.

As a masking plate material, a metallic material that does not easily melt is preferable. But, an organic material such as a fabric or a plastic can be used with a suitable coating by metal depositing, ceramic coating, or a heat-resistant coating, to provide a heat-resistant property or reflect light. It is most preferable to plate the masking plate with gold to reflect light at the surface of the masking plate. A highly bright aluminum, copper or chrome plating with a polished surface, or other metals with a mirror finishing are advantageous.

When the masking plate is used, it is preferable to arrange the masking plate close to the web to form the apertures exactly corresponding to the apertures of the masking plate. To this end, a close adhesive agent is used or a vacuum is used between the web and the masking plate.

In the system M or N, it is preferable that the web be preheated to increase the speed of the manufacturing line. The preheating not only assists in increasing the temperature but has an effect such that the molecules of the web oscillate intensely and absorb light easier even if the web may be of a transparent material, such as polyethylene or polypropylene. However, the preheating must be carried out below a melting point if the web has a melting point, or at a softening temperature if the web is an amorphous polymer or a thermosetting polymer since the shape of the web becomes unstable if the web is heated excessively.

In the system M, N, or P the web may comprise a film, a paper, a fabric, a non-woven fabric, a metal foil such as a thin copper or a thin aluminum. The film may comprise a thermoplastic resin such as polyethylene, polypropylene, polyvinyl chloride, polyamide, or polyester, or a thermosetting resin such as epoxy, unsaturated polyester, urea, or phenol. It is also possible to add an organic or an inorganic filler or a reinforcing material to the base polymer. If these additives absorb light, the ability to form apertures may be enhanced.

When the web is of a material such as polyethylene, which does not have an absorbing wavelength corresponding to the wavelength of the light such as a laser, it is preferable to add a light absorbable material to the web by blending, coating, laminating or printing so that the web as a whole can absorb the light; it is also preferable to preheat the web, as described. As a light absorbable material, there are silicon containing compounds such as silicon carbide and silicon oxide, titanium compounds such as titanium oxide, aluminum compounds such as aluminum oxide, calcium compounds such as calcium carbonate, sulfur compounds, phosphatic manganese, talc, organic or inorganic pigment, pigment or dye such as carbon black and aniline black, tackifier resin such as rosin, and powder resin such as phenol. The solution of the light absorbable material (for example, sodium silicate) can be used as an adhesive material.

The system P is advantageous when the web does not substantially absorb the light. It is important for the printing ink used in this system to have good light absorbing properties but not readily susceptible to a thermal cracking, evaporation, or sublimation. The printing ink should comprise a pigment, a tacky agent, a solvent and a dispersing agent with an additive comprising a silicon containing compound such as silicon carbide and silicon oxide, a metal or metal oxide such as iron, aluminum, titanium, and zirconium, a carbonized composition, or an inorganic salt. It is also possible to use an emulsion type printing ink.

The thermoplastic film used in the present invention is preferably a stretched film. For example, when a biaxially stretched film such as polypropylene, polyester, polystyrene, polyvinylidene chloride is perforated, the margins of the apertures or the resultant film are melted by heat and are not be easily torn, and thus it is possible to obtain a strong perforated film.

The films perforated by the light can be used for fabricating a non-woven fabric comprising the lamination of a warp web and a weft web. In fabricating a non-woven fabric, not-stretched or partly stretched films (including a film stretched between a pair of stretching rollers placed a short distance apart) have perforated slits, are stretched longitudinally or transversely so as to obtain a warp or weft webs, and are laminated one above the other with stretching directions crosswise to each other. It is also possible for the fully stretched film to be perforated.

The cross-laminated non-woven fabric not only has a strength 3 to 5 times larger than that of a normal non-woven fabric but can be manufactured at a high productivity rate, for example, a productivity 100 times higher than a weaving machine. A film for forming a weft web having a width of 250 to 300 millimeters is perforated at a line speed of 20 to 100 meters per minute. The warp web having a width of 1 to 3 meters is perforated at a line speed of 5 to 30 meters per minute. Accordingly, the films or webs must be perforated at a rate of 10 to 100 square meters per minute, which is realized by the present invention.

It is necessary to use an adhesion to adhere the warp and weft webs. The adhesion is applied to the film when the web is formed by co-extruding, extruding coating, or laminating. It is also advisable that a light absorbable material be mixed in the adhesion.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
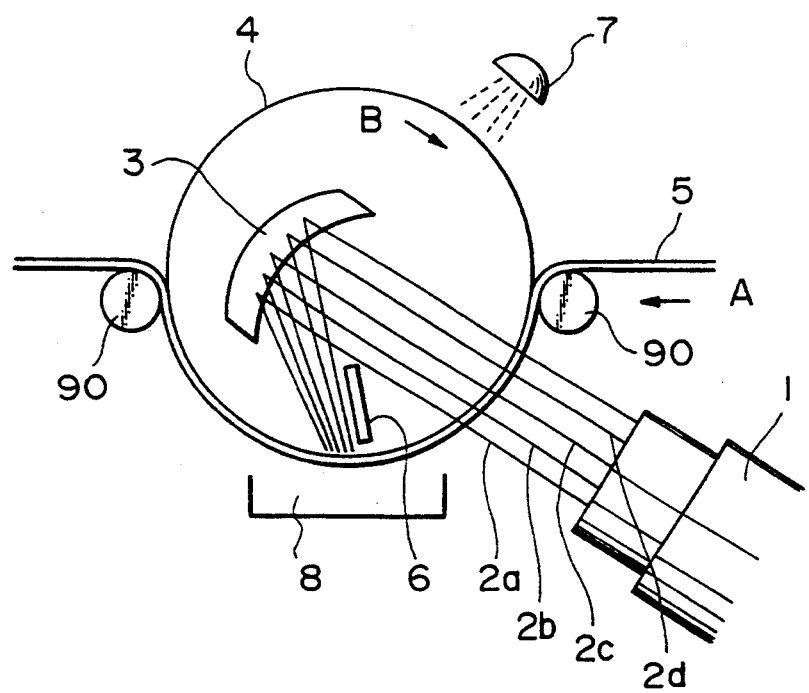
FIG. 1 is a diagrammatic side view of the apparatus according to the first embodiment of the present invention.

FIG. 1 shows the first embodiment according to the present invention, concerning the system M-1. The apparatus for fabricating a perforated web comprises conveying rollers 90 for conveying a web 5 along a predetermined path and in a predetermined direction A, an endless ring-shaped masking plate 4 arranged along the predetermined path and having a plurality of apertures 34 (FIG. 3) arranged in a predetermined pattern, a source of light 1, and optical means for directing the light from the source 1 to the masking plate 4 so as to form holes or slits 77 (FIG. 3) in the web 5. The endless masking plate 4 is circulated in the direction of the arrow B.

Figure 3:
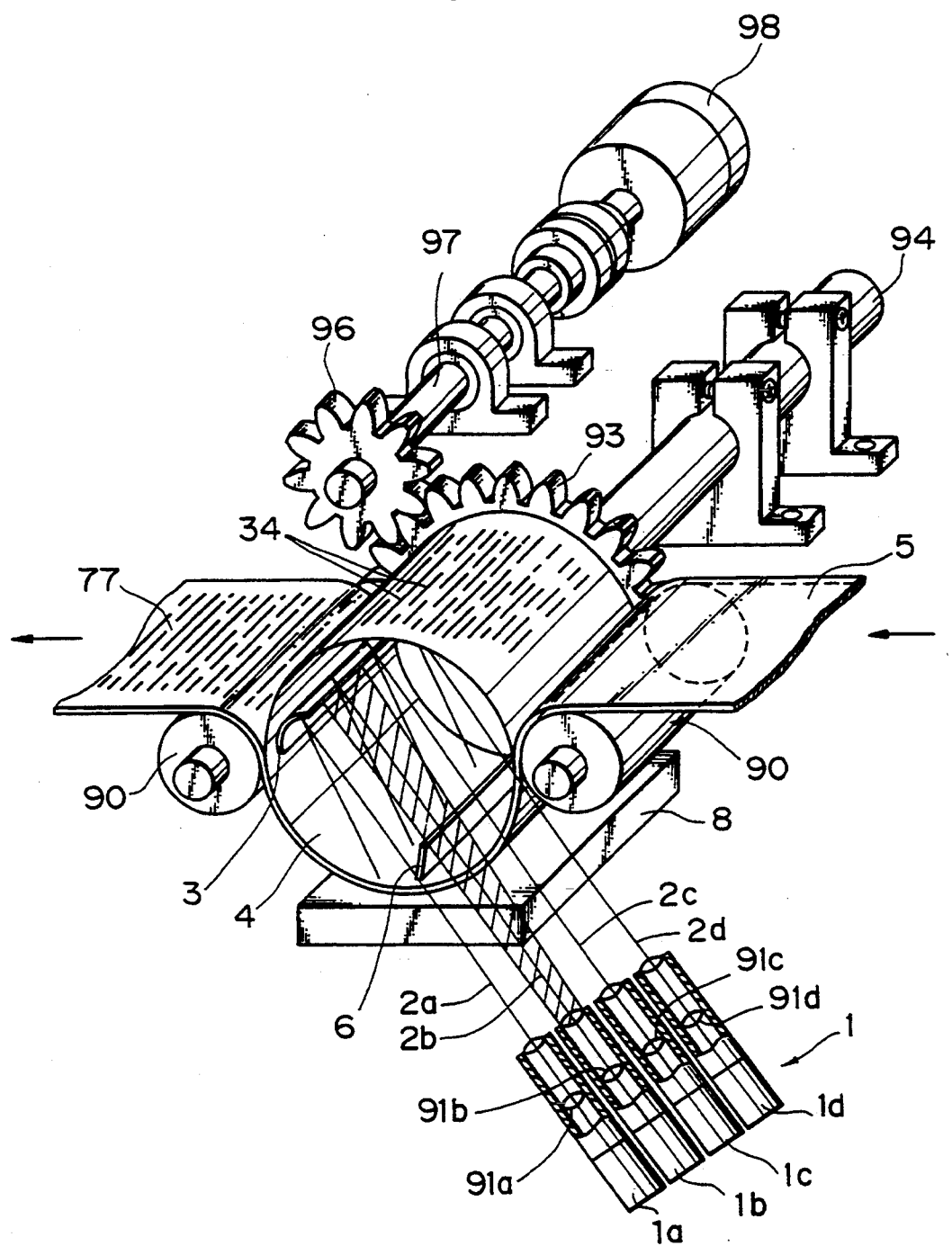
FIG. 3 is a perspective view of the apparatus of FIG. 1.
Figure 3:
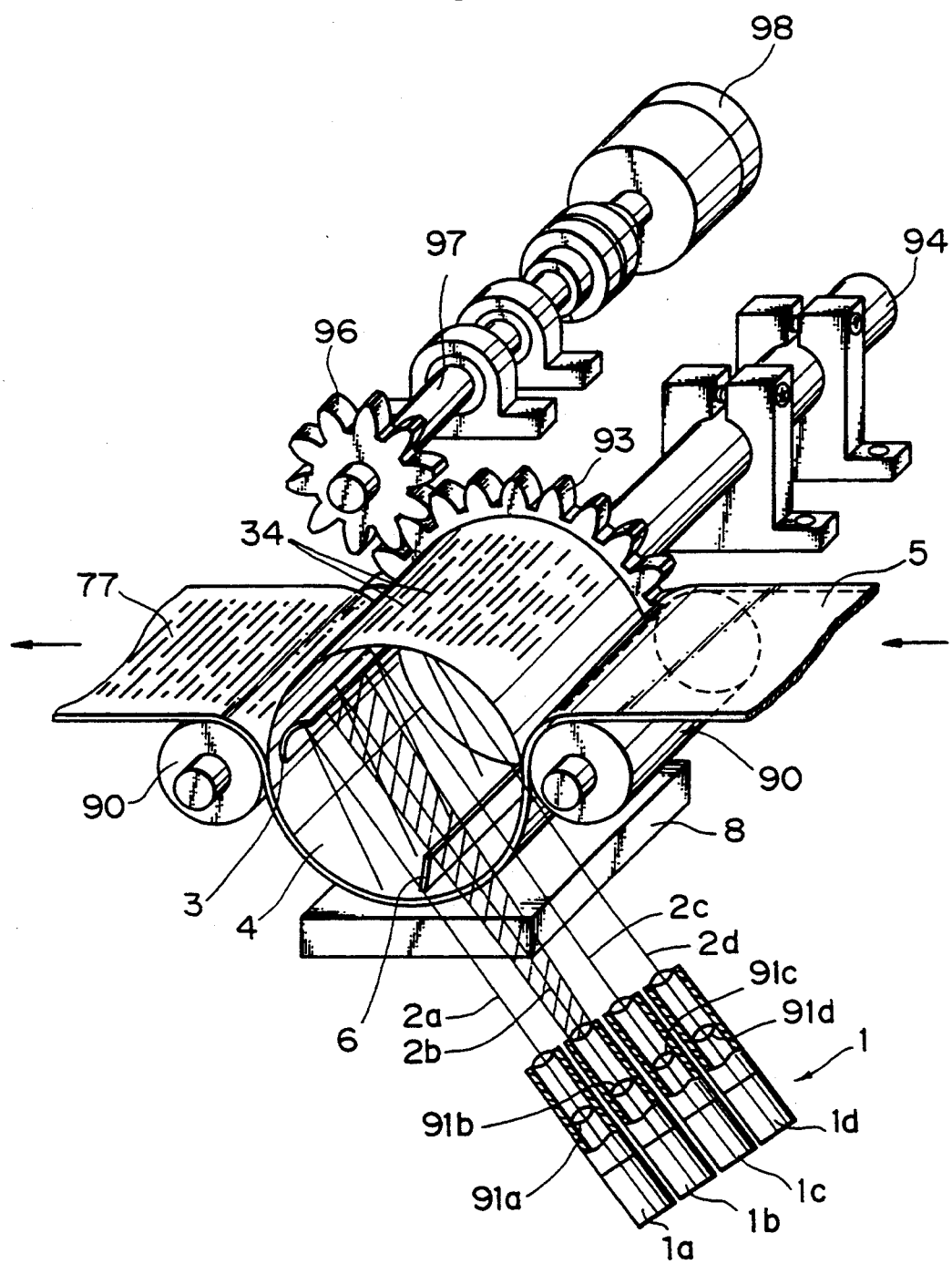
Figure 7:
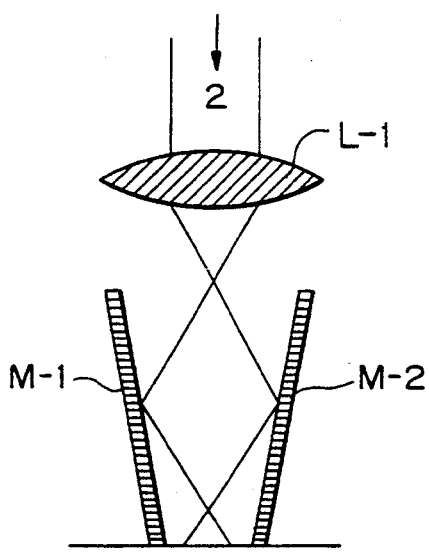
FIGS. 7 to 10 are views illustrating further examples of means for obtaining a divergent light.

In FIGS. 1 and 3, the source of light 1 is arranged outside the masking plate 4 and a concave mirror 3 is arranged inside the masking plate 4. The source of light 1 comprises a plurality of laser emitting devices 1a to 1d each of which emits a laser beam 2a, 2b, 2c, or 2d with a small beam diameter. Convex lenses 91a to 92d are arranged on the optical axes of the laser emitting devices 1a to 1d, respectively, to deliver the divergent light (the divergent beam 2b is shown by hatching in FIG. 3) to the concave mirror 3.

The light is reflected at the concave mirror 3 toward the inner surface of the masking plate 4 so that the light, as the total of the beams 2a, 2b, 2c, and 2d, is diverged to the width of the web 5. The concave mirror 3 serves to converge the light from the source 1 longitudinally about the web 5 so that the light in the shape of a narrow belt impinges upon the masking plate 4. In addition, an additional mirror(s) 6 is arranged near the inner surface of the masking plate 4 to gather the light that is reflected at the inner surface of the masking plate 4, the gathered light being again directed to the inner surface of the masking plate 4.

It is possible to use other optical means other than the illustrated means to obtain a divergent light corresponding to the width of the web 5 and to converge the light longitudinally about the web 5. Mirrors can be plated with gold, high bright aluminum, copper, and finished to a mirror surface. Also, when the source of light 1 emits a light having a sufficient width corresponding to the width of the web 5, for example, when an infrared light, an ultraviolet light or a mercury lamp is used, it is possible to omit the light diverging means.

A spray nozzle 7 is arranged above the masking plate 4 to supply cooling water to cool the masking plate 4. The cooling water flows to a gap between the masking plate 4 and the web 5 to provide surface tension acting so as to maintain close contact between the web 5 and the masking plate 4 and form holes or slits 77 exactly coinciding with the apertures 34 of the masking plate 4. It is possible to mix a tacky agent to a light absorbable agent and when cooling and a supply of the light absorbable agent are required, it is possible to arrange the spray nozzle 7 inside the masking plate 4 so as to hold the light absorbable agent in the apertures 34 of the masking plate 4. However, it should be noted that the masking plate 4 should not be excessive since a preheating of the web 5 is preferable for increasing the speed of the manufacturing line. Also, a vacuum box 8 is arranged below the web 5 to draw a smoke occurring when the web 5 is burned by the light when forming the holes or slits 77. The smoke may reduce the efficiency of the laser beam, soil the mirrors and lenses, and store the heat thereby adversely affecting the performance of the system.

Figure 4:
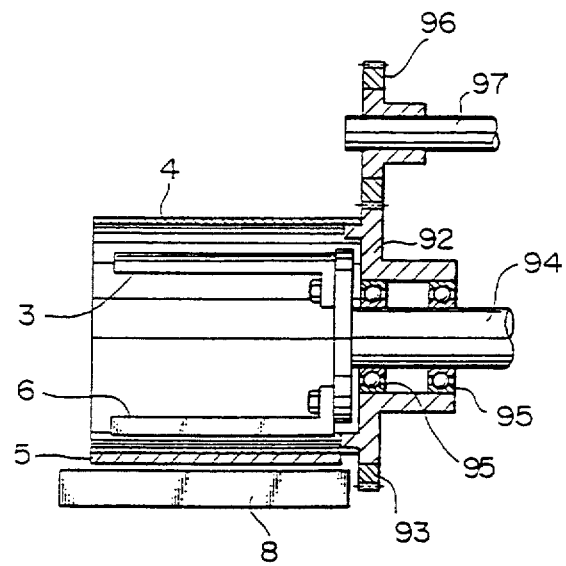
FIG. 4 is a cross-sectional view of the apparatus of FIG. 3.

In FIGS. 3 and 4, the masking plate 4 is supported at one side thereof by a cylindrical rotatable body 92 having a gear 93. The rotatable body 92 is supported on a stationary shaft 94 by bearings 95. The stationary shaft 94 extends in the masking plate 4 and supports the concave mirror 3 and the mirror 6. Another gear 96 is supported to a shaft 97 and engages with the gear 93. An electric motor 98 drives the shaft 97 and thus the masking plate 4.

As shown in FIG. 3, the masking plate 4 has a plurality of apertures 34 arranged in rows in a staggered manner. The masking plate is made, for example, from high bright aluminum or copper having a high reflecting surface, and it is possible to plate the inner surface of the masking plate 4 with gold or chrome. As one example, the masking plate 4 has a width of 400 millimeters including a central region of 350 millimeters in which apertures 34 are arranged. The masking plate 4 is cylindrical and has a diameter of 350 millimeters. The masking plate 4 has a thickness of 0.5 millimeters, and when the masking plate 4 has a thickness less than the above dimension (for example, 0.3 millimeters), it may be preferable to arrange a reinforcing rib at the free end of the masking plate 4. Each of the apertures 34 has a dimension of 10 millimeters in the transverse direction of the web 5, and a dimension of 0.2 millimeters in the longitudinal direction of the web 5. The apertures 34 are arranged at a pitch of 2 millimeters in the longitudinal direction of the web 5.

Figure 2:
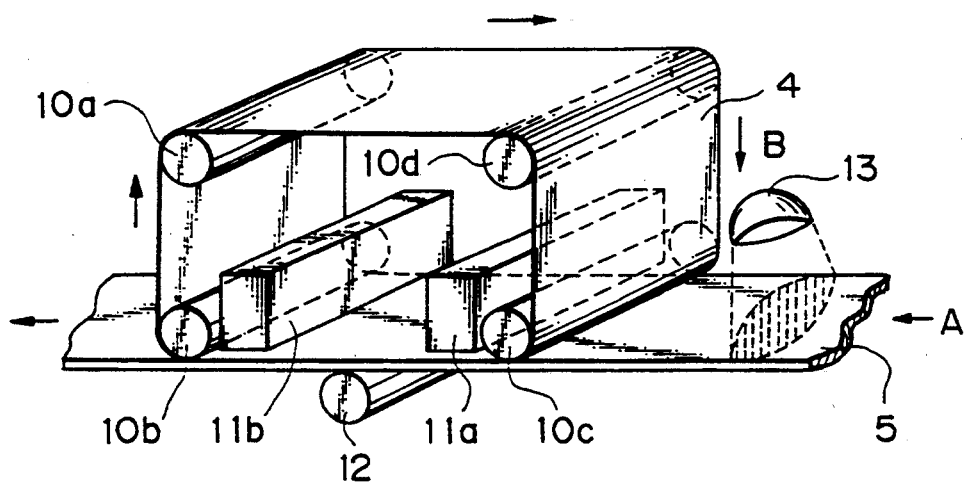
FIG. 2 is a diagrammatic side view of the apparatus according to the second embodiment of the present invention.

FIG. 2 shows the second embodiment according to the present invention. In FIG. 2, elements similar to those of FIG. 1 are deleted. The endless masking plate 4 of this embodiment is formed in the shape of a polygonal cylinder and guided by guide rollers 10a to 10d. The web 5 is conveyed in the direction of the arrow A, and the endless masking plate 4 is circulated in the direction of the arrow B, and it is possible to arrange appropriate elements inside the masking plate 4. Vacuum boxes 11a and 11b are arranged inside the masking plate 4 to extract the smoke and to maintain contact between the masking plate 4 and the web 5. A backup roll 12 is arranged below the web 5 to maintain contact between the masking plate 4 and the web 5 to improve the accuracy of the perforated hole and the efficiency of the perforation at the backup roll 12. Also, the web can be preheated by an infrared heater 13 but it is possible to preheat the web 5 by other means such as hot air or a hot cylinder.

A portion of the inner surface of the masking plate 4 where the light impinges, is concave in FIG. 1, and flat in FIG. 2, but there is a case in which a portion of the inner surface of the masking plate 4 where the light impinges is convex, thereby efficiently recovering the light reflected at the masking plate 4 by mirrors.

Figure 5:
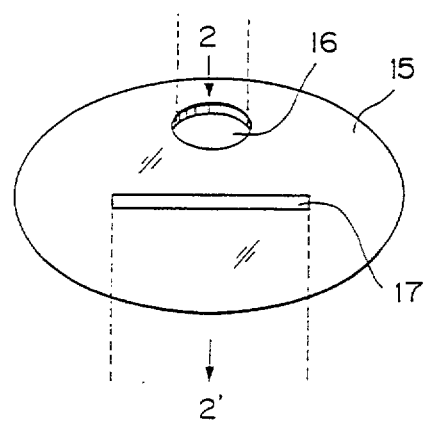
FIG. 5 is a view illustrating an example of a means for obtaining a divergent light.

FIG. 5 shows a modification of an optical means for obtaining a divergent light. This embodiment comprises an integrating sphere 15 having an internal surface plated with gold, an inlet 16, and a narrow and elongated outlet 17. The light enters the integrating sphere 15 from the inlet 16, repeats diffused reflections within the integrating sphere 15 many times, and exits from the integrating sphere 15 in a uniform distribution.

Figure 6:
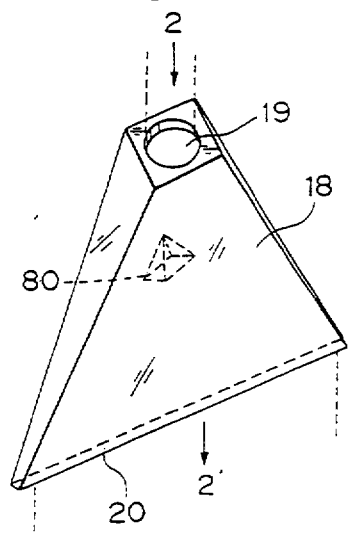
FIG. 6 is a view illustrating another example of a means for obtaining a divergent light.

FIG. 6 shows a modification of an optical means for obtaining a divergent light. This embodiment comprises a box 18 having an internal surface plated with gold, an inlet 19, and a narrow and elongated outlet 20. A square pyramid mirror 80 is inserted in the box 18 so as to create diffused reflections of light. The light exits from the box 18 in an elongated and narrow form. The box 18 may be oval shaped having one end collapsed and elongated. The integrating sphere 15 and the box 18 may be cooled.

FIGS. 7 to 10 show further modifications of an optical means for obtaining a divergent light. The embodiment of FIG. 7 comprises a convex lens L-1 to obtain the convergent light appearing at a position other than the focus thereof. A pair of mirrors M-1 and M-2 are arranged opposite each other to convert the divergent light 2 in an elongated and narrow form. The mirrors M-1 and M-2 are not necessarily symmetrically arranged and are not necessarily flat mirrors. It is also possible to constitute the mirrors M-1 and M-2 from the composite mirrors.

Figure 8:
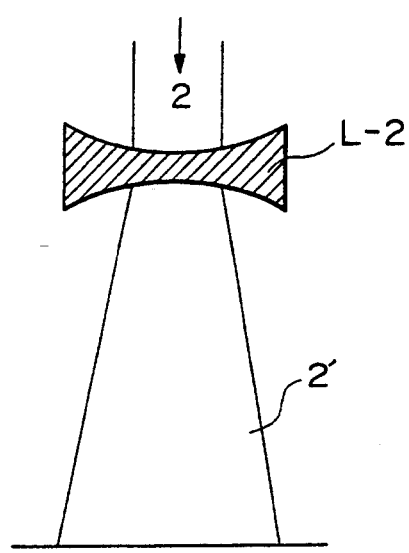

The embodiment of FIG. 8 comprises a concave lens L-2 to obtain the convergent light 2'. In this case, it is possible to use mirrors M-1 and M-2, as in the previous case.

Figure 9:
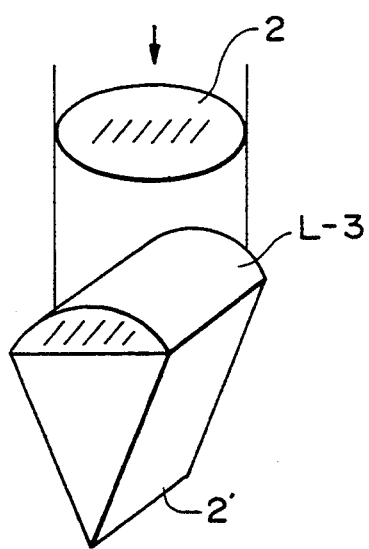

The embodiment of FIG. 9 comprises a cylindrical lens (a sector of a cylinder) L-2 to obtain the convergent light 2'.

Figure 10:
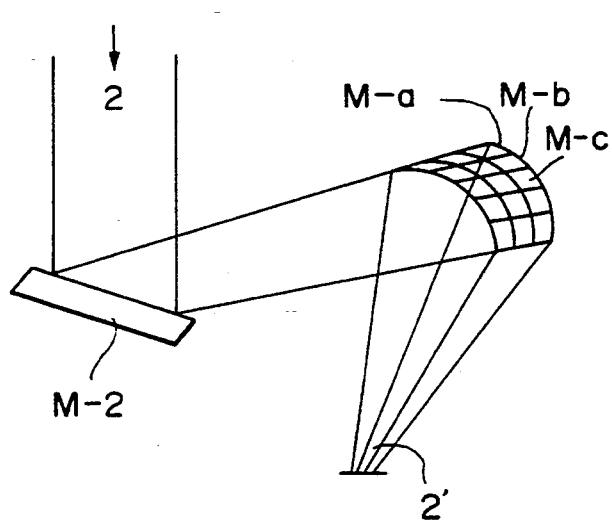

The embodiment of FIG. 10 comprises a combination mirror comprising a plurality of segment mirrors M-a, M-b, M-c, . . . , arranged to obtain the convergent light 2'.

The above examples are shown in a simplified manner and additional optical elements and cooling means (not shown) can be used with the illustrated optical elements. It is possible to use the concave mirror 3 of FIG. 1 and elements of FIGS. 7 to 10 individually and it is possible to use these elements in combination. The lens used in the present invention must absorb the light which is determined according to the characteristic of the used light, and if there is an unnecessary component of light, as described later, it is possible to use filtered light or to coat or attach by baking a material to reflect the unnecessary wavelength component of the light to the lens. It is preferable that the lens is capable of being cooled.

Figure 11:
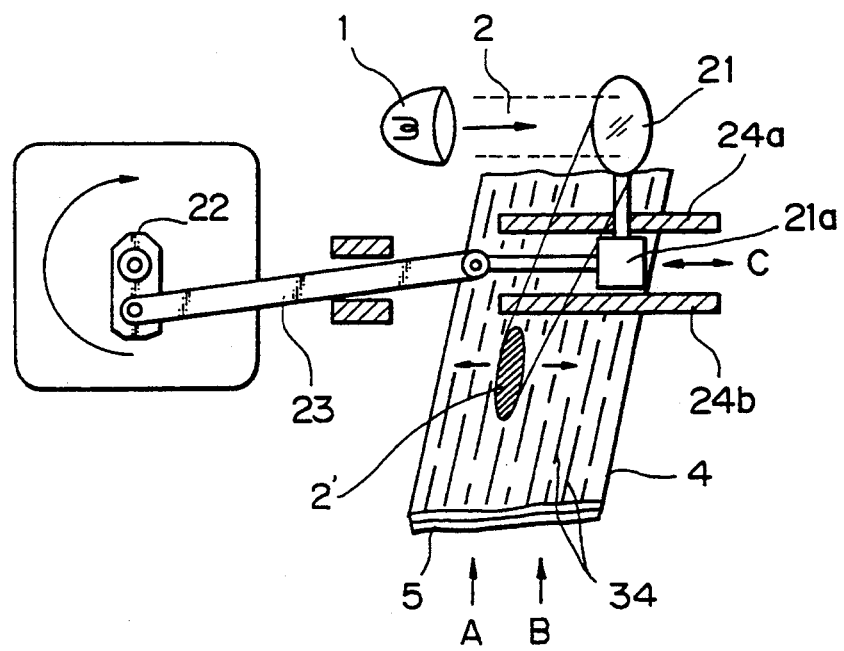
FIG. 11 is plan view illustrating the third embodiment according to the present invention.

FIG. 11 shows the third embodiment according to the present invention, concerning the system M-2. The apparatus of this embodiment comprises a means (not shown) for conveying a web 5 in the direction A, an endless masking plate 4 circulated in the direction B and having a plurality of apertures 34, a source of light 1, and an optical means for directing the light from the source 1 to the masking plate 4. In this example, the source of light 1 comprises an infrared lamp, and the optical means for directing the light from the source 1 to the masking plate 4 comprises a concave mirror 21 and a mechanism traversing or scanning the light reflected at the concave mirror 21.

The concave mirror 21 causes light 2' to impinge upon the masking plate 4 at an area having a width smaller than the width of the web. The concave mirror 21 is traversed by the traversing mechanism comprising a support block 21a supporting the concave mirror 21, a pair of guide rails 24a and 24b for reciprocatingly guiding the support block 21a transversely about the web 5, as shown by the arrow C, a crank 23 having one end connected to the support block 21a and the other end connected to an electric motor 22. The motor 22 causes the support block 21a with the concave mirror 21 to move transversely about the web 5 so that the light reflected at the concave mirror 21 traverses the width of the web 5 to form the holes or slits in the web depending on the apertures 34 of the masking plate 4. It is possible to use other elements for the traversing mechanism, for example, cams or electromagnetic elements can be used. It is also possible for several lights to be arranged along the width of the web 5, and in this case, each of the lights is traversed along a fraction of the width of the web 5.

Figure 12:
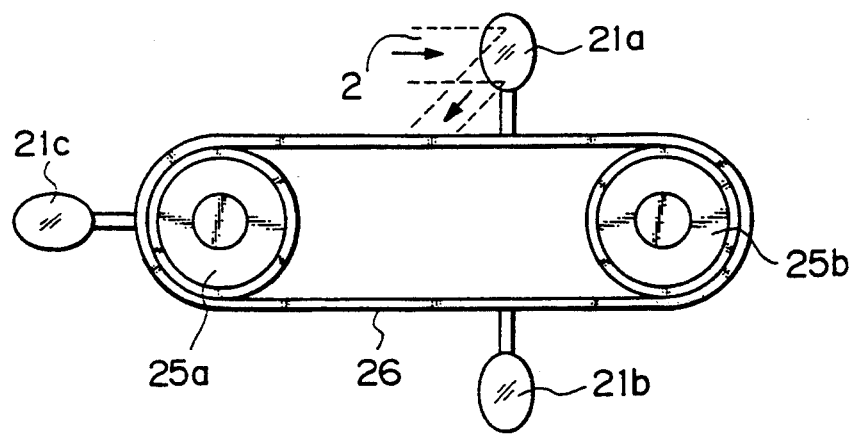
FIGS. 12 and 13 are views of further examples of means for traversing the light, respectively.
Figure 13:
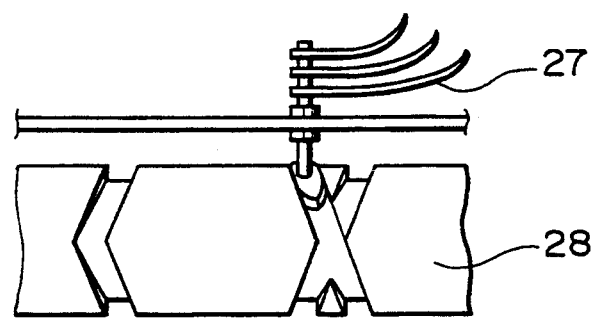

FIGS. 12 and 13 are views of further examples of the traversing means. In FIG. 12, a plurality of mirrors 21a to 21c are attached to a belt 26 travelling between pulleys 25a and 25b. One of the mirrors 21a to 21c, which is above the belt 26, receives and reflects the light 2 so that the light traverses the web 5. When optical fibers can be used, for example, with the YAG laser, or when the light is guided by a flexible tube, as in a laser scalpel for a medical application, it is possible to traverse the optical fibers or the flexible tube. FIG. 13 shows an example in which a bundle of optical fibers 27 is traversed depending on the rotation of a cam 28. It is also possible to use an oscillating mirror in FIG. 16 or a polygonal mirror in FIG. 17.

Figure 14A:
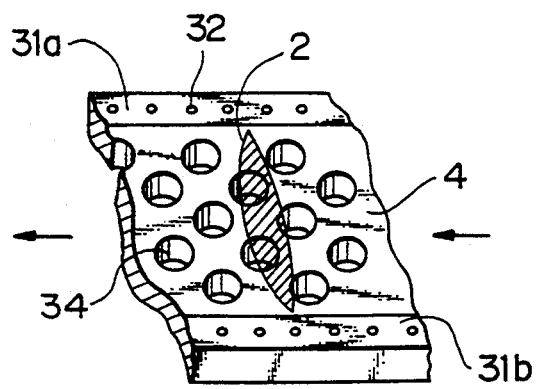
FIGS. 14A to 14C are views of examples of the light irradiated on the masking plate.
Figure 14B:
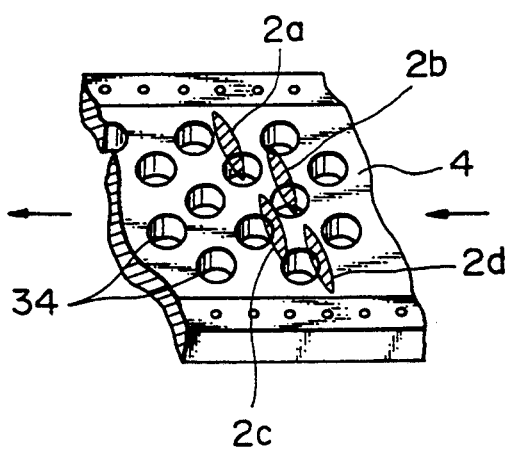
Figure 14C:
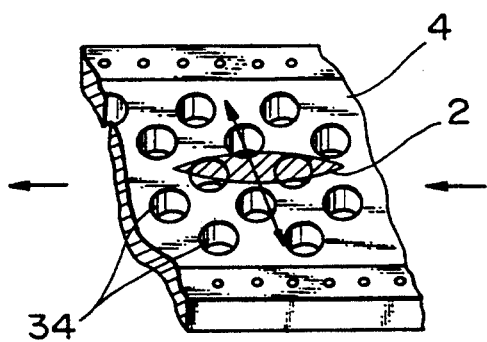

FIGS. 14A to 14C are views of examples of preferable patterns of the light irradiated on the masking plate in the system M. Opposite sides 31a and 31b of the masking plate 4 are reinforced and have holes 32 for engagement with a sprocket wheel to drive the masking plate 4. A plurality of apertures 34 are formed in the central portion of the masking plate 4. The apertures 34 are shown in a circular shape in this example, but the apertures 34 can be formed in a variety of shapes, as shown in FIGS. 27A to 32A. The masking plate 4 can be made from copper or iron, and the apertures 34 can be formed in the masking plate 4 by a chemical etching process or by a laser cutting.

As shown in FIG. 14A, in the system M-1, the light 2 has a constant width corresponding to the width of the web 5. The light 2 is narrowed longitudinally about the web 5 as small as possible so that the intensity of the light per unit area becomes large and the efficiency of the perforation is high. FIG. 14B also concerns the system M-1, in which a plurality of spaced light 2a to 2d having respective impinging areas are arranged to cover the width of the web 5. This example is advantageous when it is difficult to manufacture a single, large source of light 1.

FIG. 14C concerns the system M-2, in which the light 2 traverses the width of the web 5. The light 2 is extended longitudinally about the web 5 and it is possible to increase the line speed without excessively increasing the traversing speed.

Figure 15:
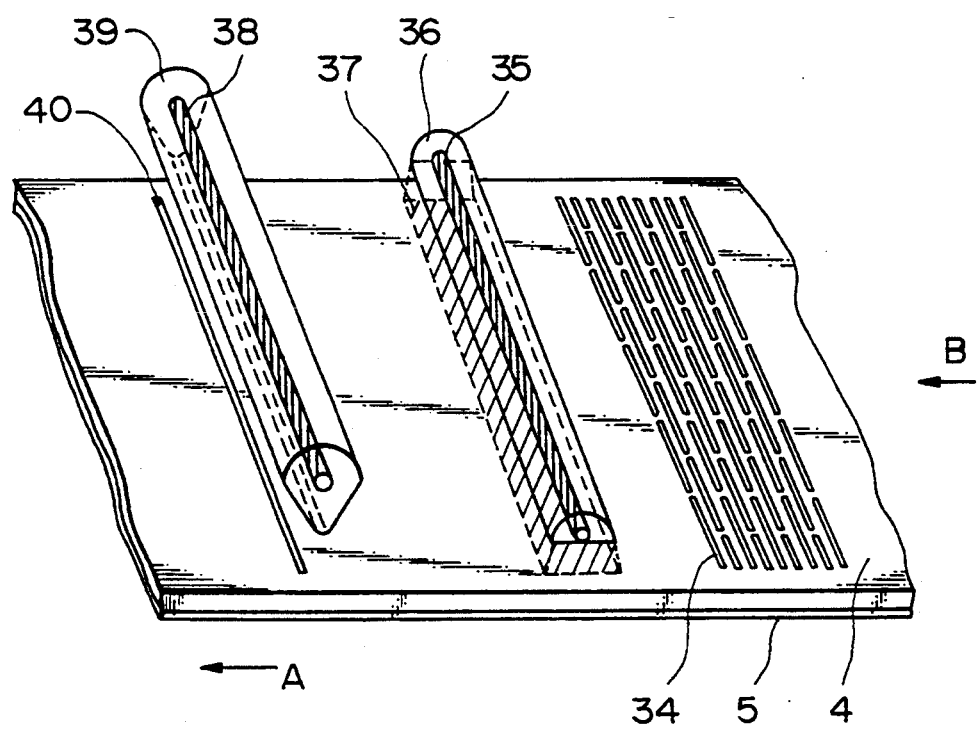
FIG. 15 is a perspective view illustrating the fourth embodiment according to the present invention.

FIG. 15 shows the fourth embodiment according to the present invention, concerning the system M-1. The apparatus of this embodiment comprises a means (not shown) for conveying a web 5 in the direction A, an endless masking plate 4 circulated in the direction B and having a plurality of slits 34 arranged in transverse rows (the slits 34 are shown partly in the masking plate 4), a source of light, and an optical means for directing the light from the source to the masking plate 4. In this example, the source of light comprises an ultraviolet lamp 35 having an elongated shape along the width of the web 5 and an infrared lamp 38 having an elongated shape along the width of the web 5 and arranged on the downstream side of the ultraviolet lamp 35. The ultraviolet lamp 35 is covered by a cover 36 that reflects the light from the ultraviolet lamp 35 to the masking plate 4 to direct a thick irradiation pattern 37 to the masking plate 4. The ultraviolet beam gives the web 5 and optical-chemical action via the slits 34. The infrared lamp 38 is also covered by a cover 39 that reflects the light from the infrared lamp 38 to the masking plate 4 so as to direct a narrow irradiation pattern 40 to the masking plate 4 to form slits in the web 5 via the slits 34.

It is possible to use a filter to select a desirable wavelength of the infrared light, thereby reducing the temperature rise of the masking plate 4 while providing necessary energy to the web 5 for forming slits. The irradiation pattern 40 of the infrared light is preferably as narrow as possible in the longitudinal direction of the web 5 so as to concentrate the energy of the infrared light applied to the web 5. In this regard, it is advantageous to use a cylindrical mirror for the cover 39 to collect the light in a linear pattern on the masking plate 4.

It is also possible to arrange a plurality of infrared light emitting devices in multiple stages. It is also possible to arrange a plurality of infrared light emitting devices to irradiate the light in a linear pattern on the masking plate 4.

In the case that the ultraviolet light is used with the infrared light, the molecules of the web 5 are denatured by the optical-chemical action of the ultraviolet light so as to easily absorb the infrared light and decompose the web 5, resulting in increased efficiency. The system M using the ultraviolet light is advantageous when the property of the web 5 changes upon the masking plate 4 overheating, or when the web 5 absorbs less infrared light.

The system N does not use a circulating masking plate, but the web 5 is irradiated with a converged light moving transversely about the web 5 so that the light intermittently impinges upon the web 5. This system N may use an element to block the light intermittently. In the system M, a majority of the light impinging portions of the masking plate 4 around the apertures 34 is not efficiently used, but in the system N, the majority of converged light can be used and the light is efficiently used. However, in the system N, a pattern of the slits is restricted and the total arrangement becomes complex.

Figure 16:
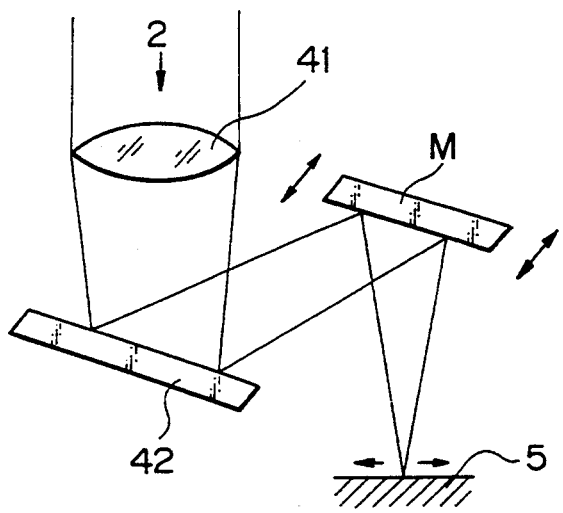
FIGS. 16 and 17 are diagrammatic views of means for traversing the light so that the light intermittently impinges upon the web, respectively.
Figure 17:
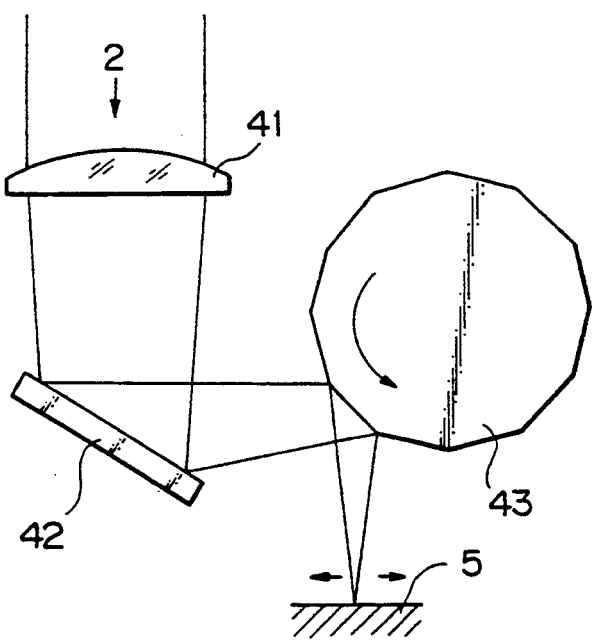

FIGS. 16 and 17 show a means for traversing the light so that the light impinges upon the web 5 intermittently, respectively. This means is used in the system M-2 or N. The embodiment of FIG. 16 comprises a convex lens 41, a mirror 42, and an oscillating mirror M oscillated by a mechanism not shown, as shown by an arrow. The light passes through the convex lens 41 and is reflected at the mirror 42 toward the oscillating mirror M, which causes the light to traverse along the width of the web 5. The oscillating mechanism may comprise a crank mechanism, a cam mechanism, or an electromagnetic mechanism.

The embodiment of FIG. 17 comprises a convex lens 41, a mirror 42, and a polygonal mirror 43 that is rotated, as shown by the arrow. The light is reflected at one of the surfaces of the polygonal mirror 43 thereby causing the light to traverse along the width of the web 5. Other mechanisms such as those shown in FIGS. 11 to 13 can also be used in the system N.

In a modification of the system N using an oscillating and segmented mirror, it is possible to combine a plurality of laser beams and a plurality of mirrors so that the reflecting surfaces are moved in accordance with instructions by a computer to provide slits in the web 5 in a desired pattern, as will be drafted by a CAD (computer aided drafting). In this system, the slits are provided in longitudinal and transverse directions and the web can be stretched in the directions of the slits.

In the system N, it is possible to emit the laser beam intermittently by a Q-switching method or as pulse beams in order to irradiate the web intermittently. Alternately, it is possible to arrange an obstacle in the path of the light, and the obstacle can be moved longitudinally or transversely about the web 5.

Figure 18:
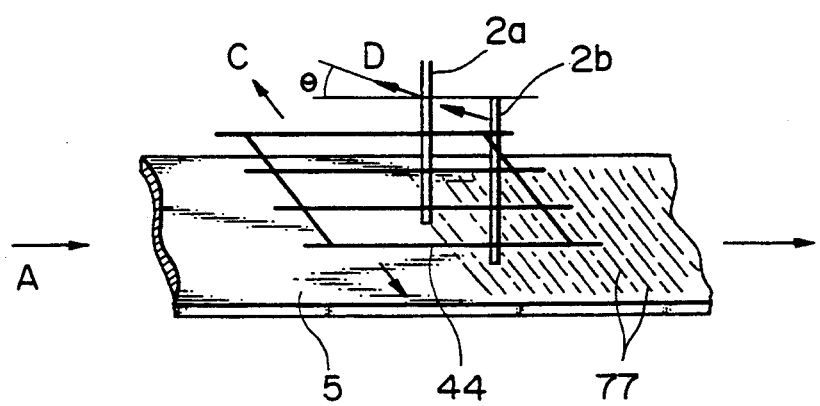
FIGS. 18 to 22 are diagrammatic views of means for traversing the light so that the light intermittently impinges upon the web, respectively.
Figure 30A:
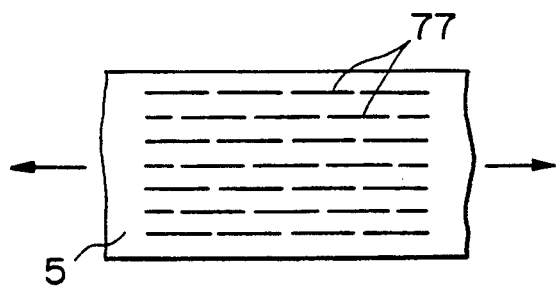
FIGS. 30A and 30B are views illustrating another example of slits formed in the web and the slits when the web is subsequently stretched.

In FIG. 18, an obstacle 44 in the shape of a grid is arranged above the web 5 and below the source of light and moved transversely about the web 5, as shown by the arrow C. Two laser beams 2a and 2b are traversed at an angle $\theta$ to the longitudinal direction of the web 5, as shown by the arrow D. The web 5 is conveyed in the direction of the arrow A. The angle $\theta$ is determined depending on the conveying speed of the web 5, the number of the laser beams, the traversing speed of the laser beam, and the moving speed of the obstacle 44. By moving the obstacle 44, it is possible to reduce the damage of the obstacle 44 caused by heat. It is possible to obtain transversely staggered slits 77, as shown in FIG. 30A. In the system N, it is possible to arrange a plurality of beams along the width of the web 5.

Figure 19:
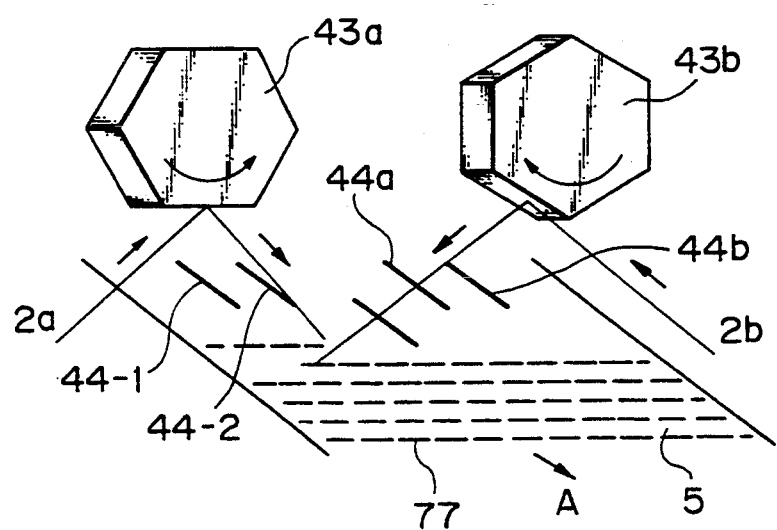

In FIG. 19, a polygon mirror 43a is used with obstacle bars 44-1 and 44-2, and another polygon mirror 43b is used with obstacle bars 44a and 44b. The beams 2a and 2b are reflected at the polygon mirrors 43a and 43b, respectively, and directed to the web 5 intermittently via the obstacle bars 44a and 44b, and 43a and 43b, respectively. In this embodiment, slits 77 extending transversely about the web 5 are obtained. One polygon mirror 43a and the obstacle bar 44-1 and 44-2 are shifted longitudinally about the web 5 relative to the other polygon mirror 43b and the obstacle bars 44a and 44b, so that the unslit portions of one transverse row do not coincide with the unslit portions of the adjacent transverse row. It is also possible to use one polygon mirror with two beams that are incident to the polygon mirror at different angles.

Figure 20:
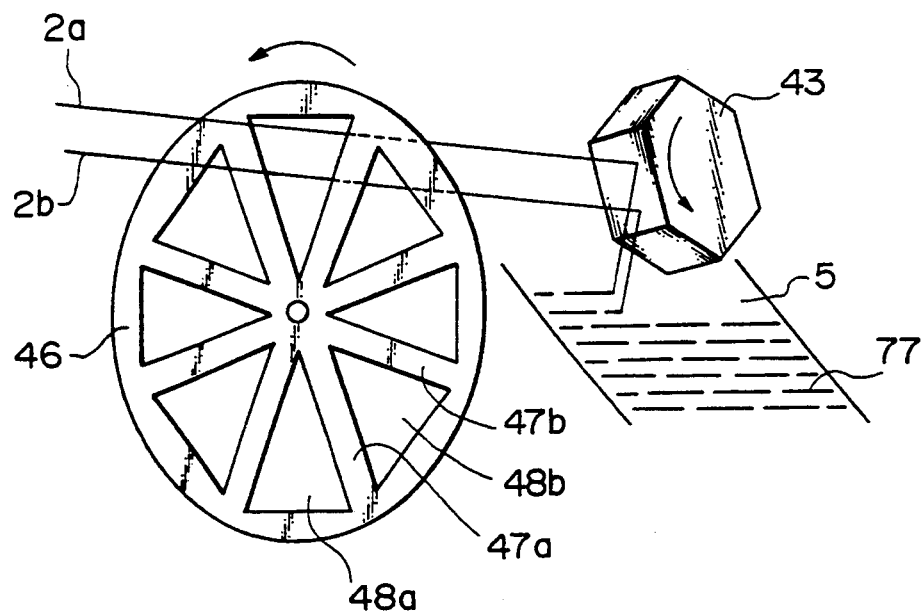
Figure 21:
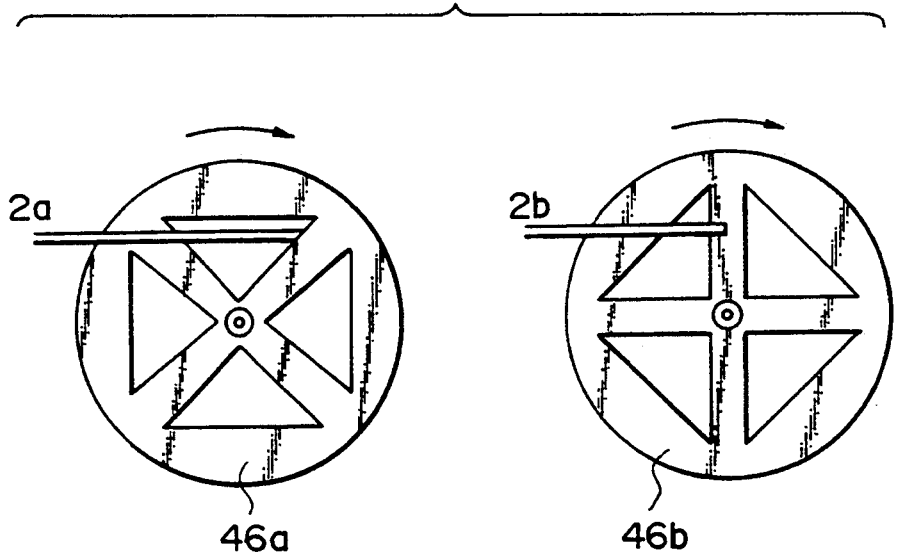

In FIG. 20, the obstacle comprises a rotatable wheel 46 having radial spoke-like portions 47a and 47b, spaces 48a and 48b being formed between the adjacent spoke-like portions 47a and 47b. The beams 2a and 2b are directed to the wheel 46, and the beams passing through the spaces 48a and 48b are reflected at the polygonal mirror 43 toward the web 5 to form the slits 77. With this embodiment, the unslit portions of one transverse row do not coincide with the unslit portions of the adjacent transverse row. It is possible to replace the polygonal mirror 43 with another traversing means, described above. In FIG. 21, the obstacle comprises two rotatable wheels 46a and 46b and receiving beams 2a and 2b, respectively. In this embodiment, it is possible to move the beams 2a and 2b radially about the respective wheels 46a and 46b to change the length of the slits 77.

Figure 22:
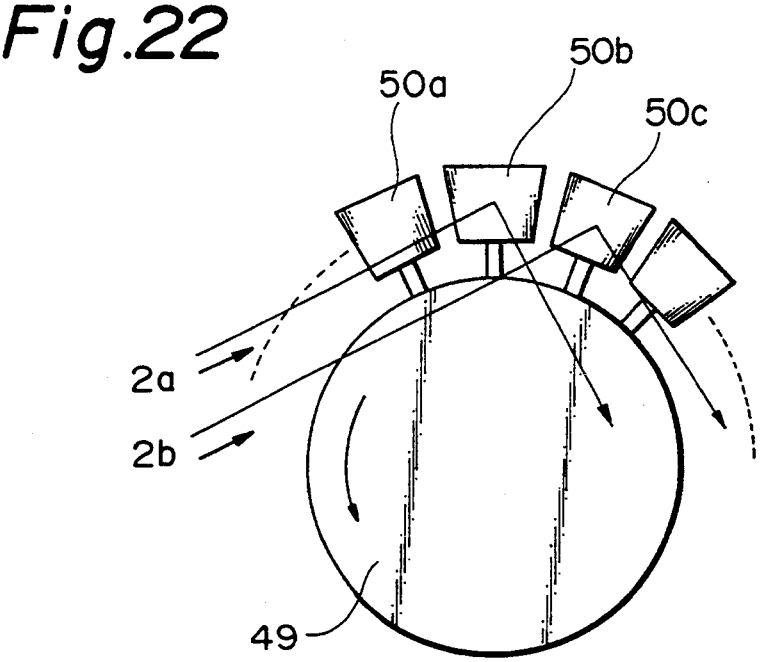

In FIG. 22, the system N comprises a rotatable wheel 49, and a plurality of mirrors 50a, 50b, and 50c arranged on the periphery of the wheel 49 so that the reflecting angles are varied slightly. Accordingly, the light impinges upon the web 5 intermittently.

Figure 23:
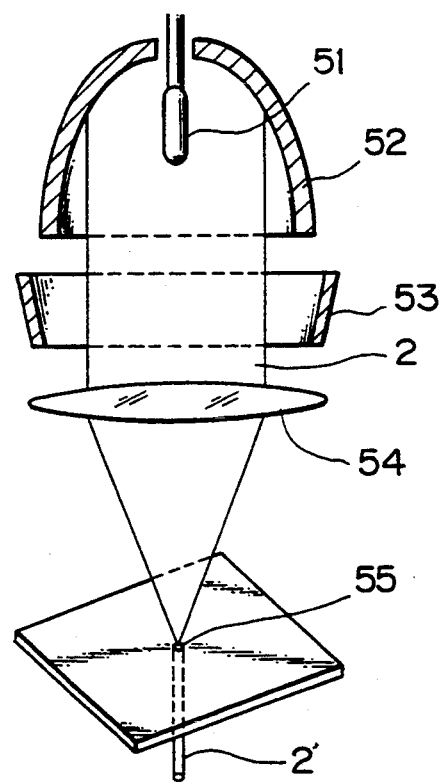
FIGS. 23 and 24 are views illustrating means for obtaining a convergent light, respectively.

FIG. 23 shows an embodiment in which a convergent light is produced from an infrared lamp 51. A parabolic reflecting mirror 52 is arranged above the infrared lamp 51 to produce parallel beams. A truncated cone shaped reflector 53 is arranged below the infrared lamp 51 to return a portion of the divergent light to the parabolic reflecting mirror 52. A convex lens 54 is arranged below the cone shaped reflector 53 to converge the light. It is possible to arrange a plate having a small hole 55 to further narrow the light if convergence of the light is insufficient.

It is preferable that the infrared lamp 51 be a point source of light, but this is impossible because the infrared lamp 51 must provide sufficient power. Accordingly, the infrared lamp 51 is elongated, and arranged along the optical axis of the parabolic reflecting mirror 52. The infrared lamp 51 may comprise a halogen lamp that is coated with ceramic, so that infrared light is mainly emitted. The parabolic surface is plated with gold, and preferably cooled with water. It is possible to arrange a filter before the convex lens 54 or to coat a filter to the convex lens 54 if an unnecessary wavelength component is included. The convex lens 54 may preferably be a non-spherical lens so as to reduce aberration.

Figure 24:
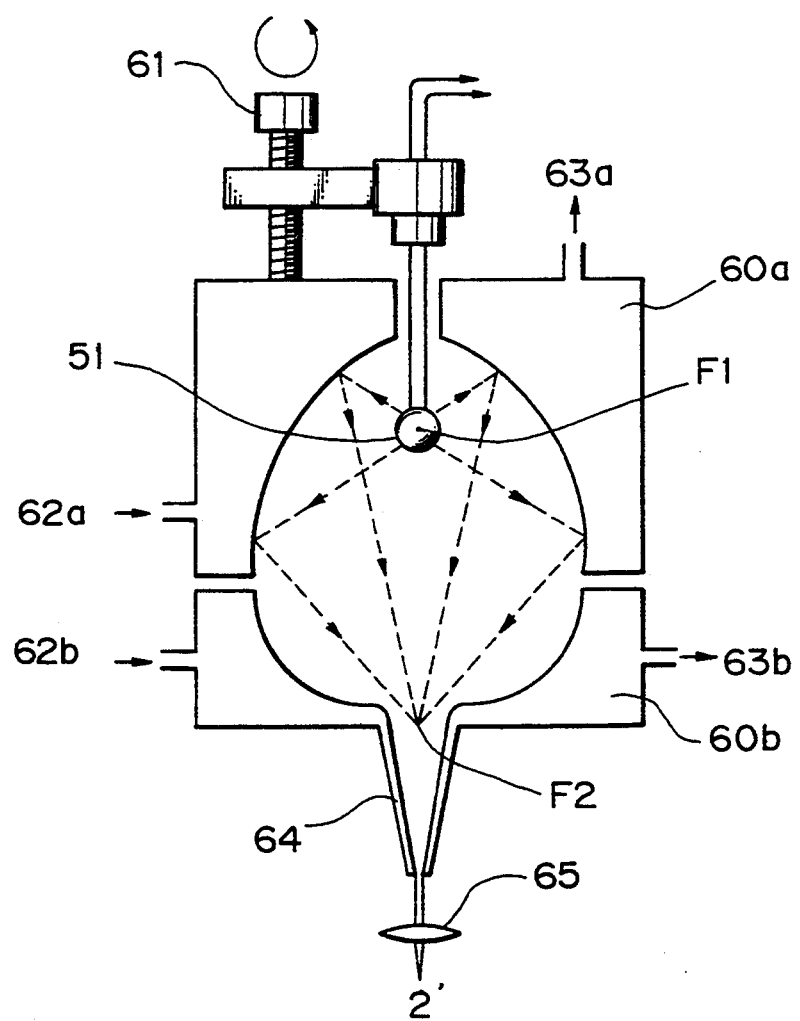

FIG. 24 shows an embodiment to produce a convergent light using a rotated ellipsoidal body. This embodiment comprises a box 60a and 60b having an internal rotated ellipsoidal surface having focuses F1 and F2, and a lamp 51 arranged on one of the focuses F1, so that the light emitting from the lamp 51 is collected at the other focus F2. The position of the lamp 51 can be adjusted by a screw 61. Water is introduced in the box 60a and 60b from inlets 62a and 62b and discharged from outlets 63a and 63b to cool the interior of the box 60a and 60b. The light collected at the focus F2 exits the box 6a and 60b from an exit pipe 64m which is tapered. The interiors of the box 60a and 60b and the exit pipe 64 are plated with gold, and the converged light emitting from the exit pipe 64 is further converged by a lens 65.

Figure 25:
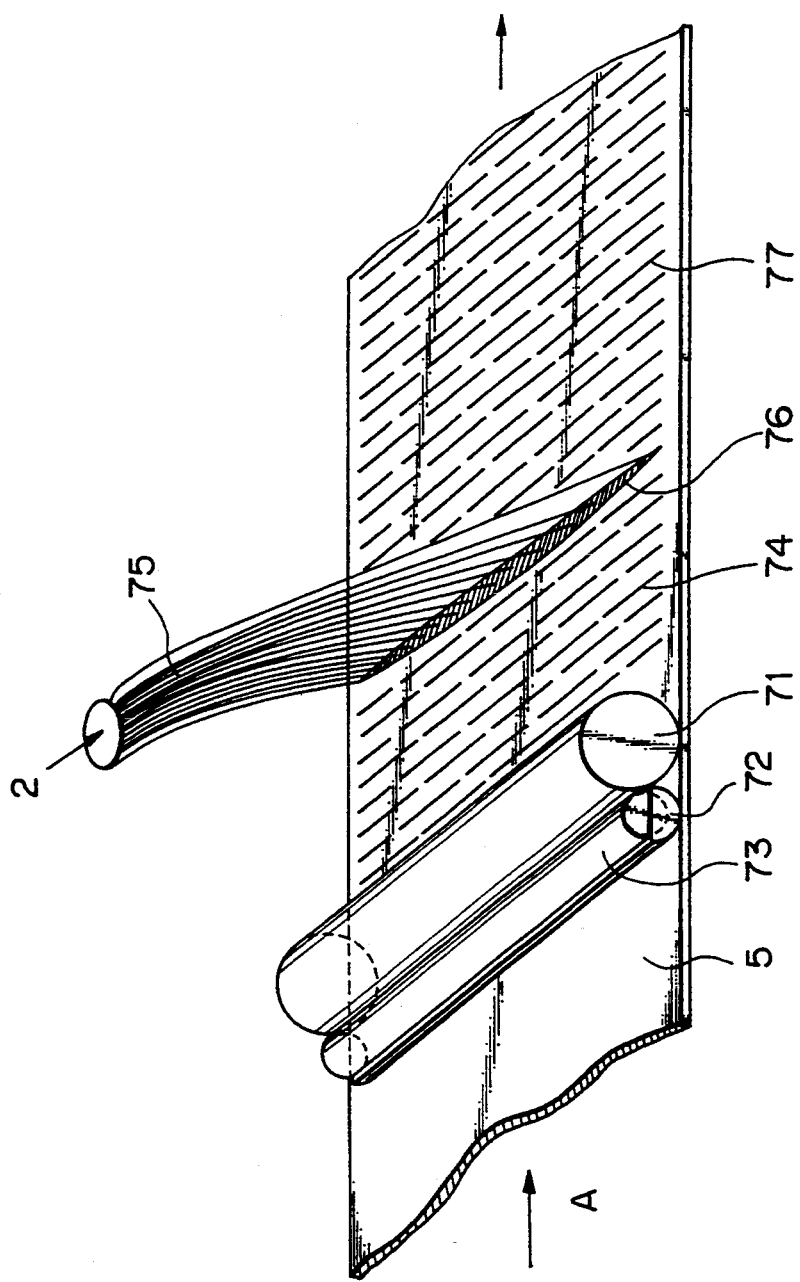
FIG. 25 is a perspective view of the apparatus realizing a printing method according to the fifth embodiment of the present invention.

FIG. 25 shows an embodiment concerning the system P. The apparatus comprises a means for conveying a web 5 along a predetermined path. A printing roller 71 is arranged so as to be in contact with the travelling web 5. An ink roller 73 is arranged in contact with the printing roller 71 to receive ink from an ink bath 72. The printing roller 71 has projections arranged in a predetermined pattern corresponding to apertures or slits to be formed in the web 5, and the printed pattern 74 is formed on the web 5. A bundle of optical fibers 76 is arranged on the downstream side of the printing roller 71 and the light 2 emitted from YAG laser is introduced in the bundle of optical fibers 76. The optical fibers 76 have the lower ends arranged on the web 5 in a narrow band to form an irradiation area 76. A laser beam from a YAG laser has a wavelength of 1.06 microns and almost polymers are transparent to the bandwidth of this wavelength. Therefore, the web 5 does not substantially absorb the light but the printed ink does absorb the light and thus is heated. In the system P, it is necessary to select an appropriate combination of the wavelength of the light, the transmittance of the web 5, and the transmittance of the ink. The pattern 74 printed on the web 5 is heated by the light 76 and thus the slits 77 are formed in the web 5.

Figure 26A:
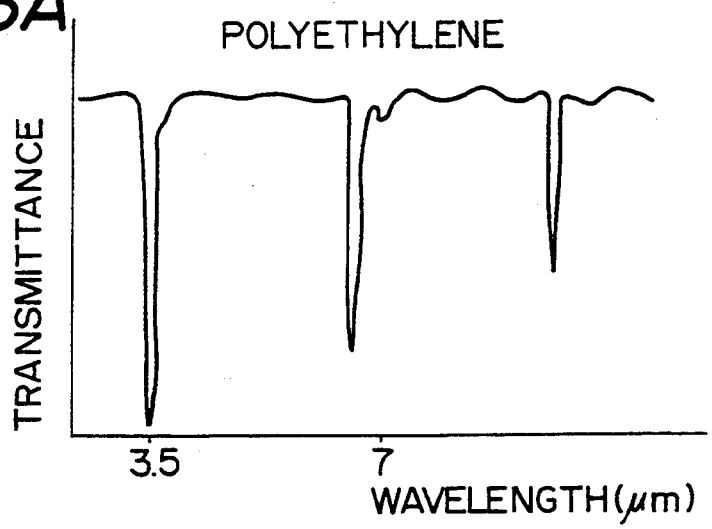
FIGS. 26A to 26C are views illustrating light absorption in the web in relation to wavelength.
Figure 26B:
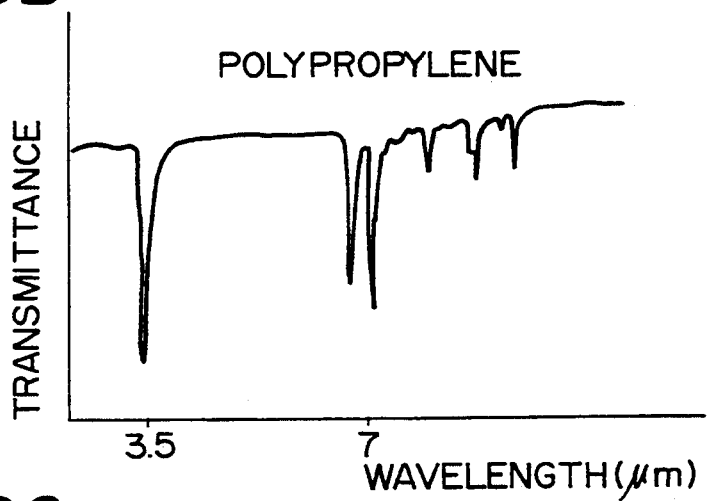

FIG. 26A shows the transmittance of polyethylene versus the wavelength and FIG. 26B shows the transmittance of polypropylene versus the wavelength. It is known that polyethylene and polypropylene have light absorbing ranges at a wavelength of approximately 3.5 and 7 microns. The transmittance of polyethylene and polypropylene by the light having a wavelength of approximately 1 micron is approximately 95 percent, although this is not shown in these Figures. Dioxide laser has a wavelength of 10.6 microns and a YAG laser has a wavelength of 1.06 microns, and accordingly, polyethylene and polypropylene do not absorb any of these laser beams.

Figure 26C:
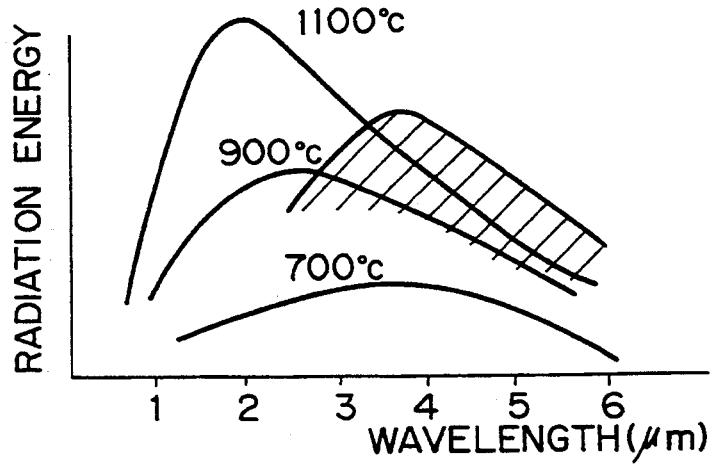
Figure 27A:
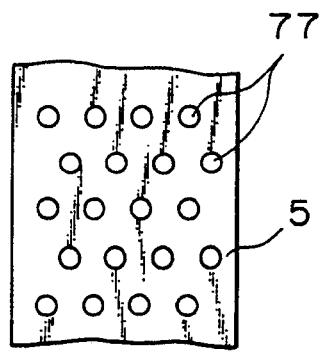
FIGS. 27A to 27D are views illustrating examples of apertures formed in the web according to the present invention.
Figure 27B:
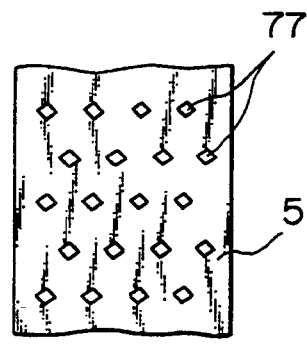
Figure 27C:
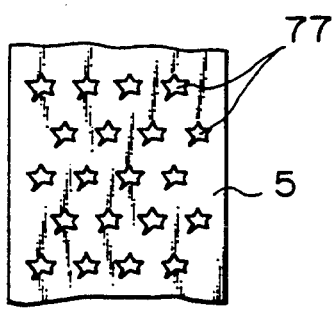
Figure 27D:
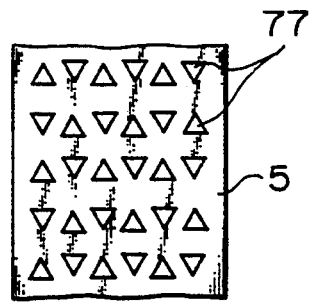

FIG. 26C shows the radiation energy of a lamp such as a halogen lamp the wavelength at the temperature of 1100° C., 900° C., and 700° C. It has been found that the lower the temperature of the heater, the lower the radiation energy but the peak of the radiation energy shifts to the long wavelength side. The curve with the hatching shows that the radiation energy is relatively high and the peak of the radiation energy is shifted to the long wavelength side, which is attained by producing the surface of the heater from a ceramic material.

FIGS. 27A to 27D show examples of a perforated web having holes 77 formed in a uniaxially or biaxially stretched film. The biaxially stretched film has strength in a longitudinal and transverse direction and has a resistance to tearing since the margins around the holes 77 are sealed by heating and it is possible to provide a good design appearance, as shown in FIGS. 27A to 27D.

Figure 28A:
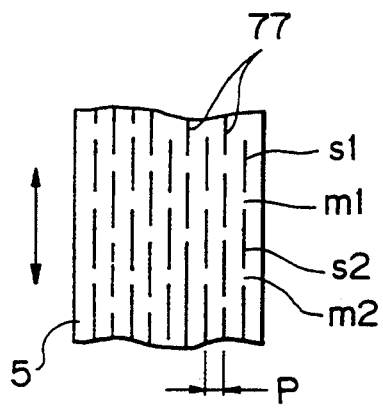
FIGS. 28A and 28B are views illustrating an example of slits formed in the web and the slits when the web is subsequently stretched.

FIGS. 28A to 32B show examples of perforated webs for fabricating a cross-laminated non-woven fabric. In FIGS. 28A and 29A, longitudinal slits 77 are formed in a non-stretched or partly stretched web 5. FIGS. 28B and 29B show that the web 5 having the longitudinal slits 77 are stretched longitudinally, as shown by the arrow in FIGS. 28A and 29A. The web is preferably stretched by a pair of stretching rollers arranged a short distance therebetween to form a network structure having widely open apertures. In FIG. 28A, s1 and s2 represent slits (apertures), and m1 and m2 represent unslit portions between the slits. To form the stretched web, it is important that the unslit portions in one row do not coincide with the unslit portions in the transversely adjacent rows. The unslit portions are precisely arranged in a staggered manner in the embodiment, but it is not always necessary to arrange as such.

Figure 29A:
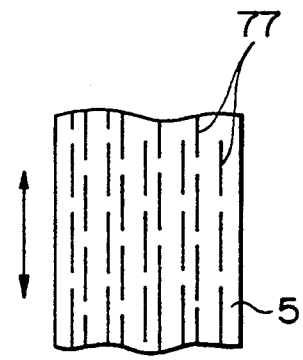
FIGS. 29A and 29B are views illustrating another example of slits formed in the web and the slits when the web is subsequently stretched.
Figure 28B:
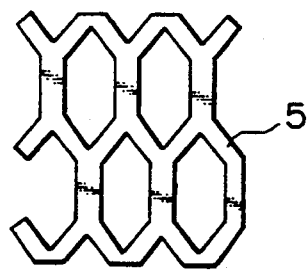
Figure 29B:
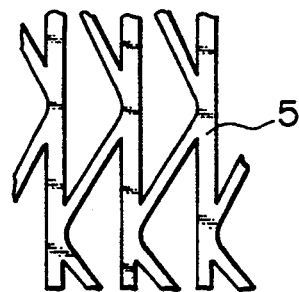
Figure 30B:
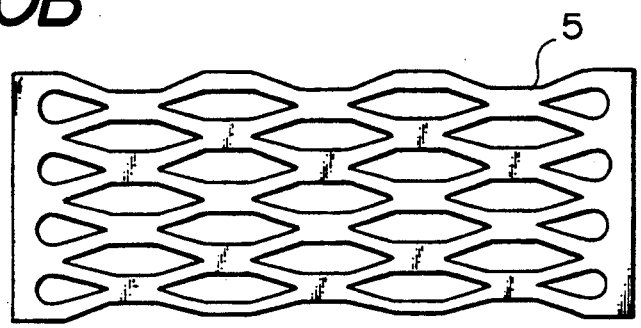
Figure 31A:
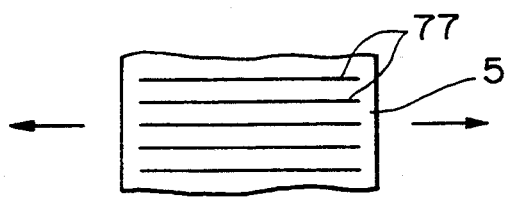
FIGS. 31A and 31B are views illustrating still another example of slits formed in the web and the slits when the web is subsequently stretched.
Figure 31B:
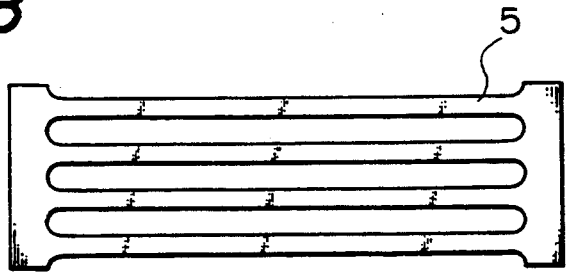
Figure 32A:
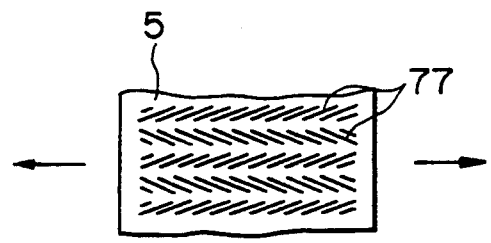
FIGS. 32A and 32B are views illustrating still another example of slits formed in the web and the slits when the web is subsequently stretched.
Figure 32B:
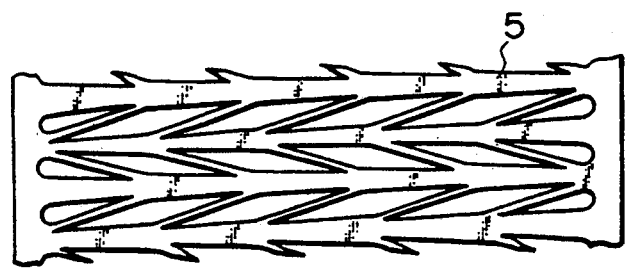

In FIGS. 30A, 31A, and 32A, transverse slits 77 are formed in a non-stretched or partly stretched web 5. In this case too, the unslit portions in one row do not coincide with the unslit portions in the longitudinally adjacent rows. FIGS. 30B and 32B show that the web 5 having the transverse slits 77 are stretched transversely, as shown by the arrow in FIGS. 30A to 32A. According to the present invention, the slits 77 are formed by the light and it is possible to obtain slits arranged in a complex pattern, as shown in FIGS. 29A and 32A.

Figure 33:
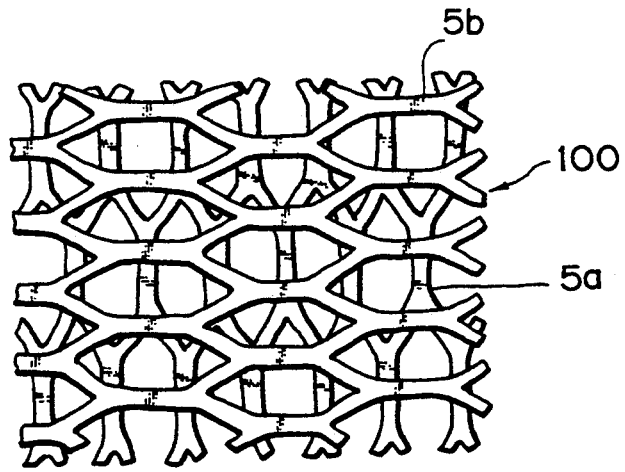
FIG. 33 is a view of the cross-laminated non-woven fabric obtained from the lamination of the webs of FIGS. 28B to 32B.

FIG. 33 shows a non-woven fabric 100 comprising the warp web 5A and the weft web 5b. The warp web 5a corresponds to the web 5 of FIG. 28B or 29B, and the weft web 5b corresponds to the web 5 of FIG. 30B or 31B. It is possible that one of the warp and weft webs 5a and 5b is formed by the light according to the present invention and the other web is formed conventionally by slitting edges. It is also possible to form slits in an uniaxially stretched film.

As described in greater detail, according to the present invention, it is possible to continuously form apertures or slits in a web continuously conveyed at high speed and the margins of the apertures or slits thus formed are clear.

We claim:

1. An apparatus for fabricating a perforated web comprising:
    conveying means for conveying a web along a predetermined path and in a predetermined direction, the web having a longitudinal direction in correspondance with the conveying direction and a width;
    an endless masking plate arranged along the predetermined path and having a plurality of apertures arranged in a predetermined pattern, the masking plate being adapted so as to be continuously circulated around a fixed point;
    a source of light; and
    an optical means for directing the light from the source to the masking plate to form apertures in the web, wherein the optical means includes first optical means for diverging the light from the source transversely about the web.

2. An apparatus according to claim 1, wherein the optical means is arranged so that the light impinges upon the masking plate at an area having a width smaller than the width of the web.

3. An apparatus according to claim 2, wherein the optical means includes second optical means for converging the light from the source longitudinally about the web.

4. An apparatus according to claim 3, wherein the optical means includes third optical means arranged between the second optical means and the masking plate for gathering the light.

5. An apparatus according to claim 1, wherein the optical means is arranged so that the light impinges upon the masking plate at an area having a width corresponding to the width of the web.

6. An apparatus according to claim 1, wherein the optical means comprises a body having a cavity with an inlet and outlet, the cavity having an internal reflecting surface at which the light incident from the inlet is subjected to diffused reflections and existing from the outlet in the pattern in conformity of the shape of the outlet.

7. An apparatus according to claim 1, wherein means for cooling the circulating masking plate is provided.

8. An apparatus according to claim 1, wherein means for extracting a smoke is provided.

9. An apparatus according to claim 1, wherein means for preheating the web is provided.

10. An apparatus according to claim 1, wherein the source of light comprises means generating an ultraviolet light and means for generating an infrared light.

11. An apparatus according to claim 1, wherein the masking plate has a portion that contacts the web and moves with the web.

12. An apparatus according to claim 11, wherein the said portion that contacts the web is a curved portion.

13. An apparatus according to claim 11, wherein the said portion that contacts the web is a generally planar portion.

14. An apparatus according to claim 2, wherein the optical means includes a traversing means for transversing the light transversely about the masking plate.

15. An apparatus according to claim 1, wherein the masking plate is formed in the shape of a cylinder.

16. An apparatus according to claim 15, wherein the masking plate is formed in the shape of a circular cylinder.

17. An apparatus according to claim 15, wherein the masking plate is formed in the shape of a polygonal cylinder.

18. An apparatus according to claim 1, wherein the masking plate is supported at one side thereof by a rotatable body, and at least a part of the optical means is stationary and arranged within the masking plate, the light from the source being passed from the other side of the masking plate to at least a part of the optical means in the masking plate and to the masking plate.

19. An apparatus according to claim 18, wherein the rotatable body is supported on a stationary shaft by a bearing, the stationary shaft extending in the masking plate and supporting at least a part of the optical means.

20. An apparatus according to claim 1, wherein the source of the light emits at least one of a laser beam, an infrared light beam, and an ultraviolet beam.

21. A method for fabricating a perforated web comprising the steps of:
    conveying a web along a predetermined path and in a predetermined direction; and
    irradiating the web with a convergent light moving transversely about the web so that the light intermittently impinges upon the web, the irradiating step being carried out by at least one of the steps of: reflecting the light at an oscillating mirror, reflecting the light at a polygonal mirror, reflecting the light at a mirror moving transversely about the web, guiding the light in at least one flexible means moving transversely about the web, reflectiving the light at a plurality of mirrors attached to a rotatable body at different angles, and passing the light through a moving obstacle.

22. A method for fabricating a perforated web comprising the step of:
    printing a material having a light absorbing property to a light transparent web in a predetermined pattern;
    diverging light from a light source transversely about the web with an optical means; and
    irradiating the continuously moving web with the light.

23. A method for fabricating a stretched web comprising the steps of:
    diverging light from a light source transversely about a web with an optical means;
    irradiating the web with the light to form slits having a length, and stretching the web in the direction of the length of the slits.

24. An apparatus for fabricating a perforated web comprising:
    conveying means for conveying a web along a predetermined path an in a predetermined direction, the web having a longitudinal direction in correspondence with the conveying direction and a width;
    an endless masking plate arranged along the predetermined path and having a plurality of apertures arranged in a predetermined pattern, the masking plate being adapted so as to be continuously circulated around a fixed point;
    a source of light; and
    an optical means for directing light from the light source to the masking plate to form apertures in the web;
    wherein the source of light emits at least one of an infrared light beam and an ultraviolet beam.

25. An apparatus according to claim 24, wherein the source of light emits an infrared light beam.

26. An apparatus according to claim 24, wherein the source of light emits an ultraviolet beam.

* * * * *

UNITED STATES PATENT AND TRADEMARK OFFICE
CERTIFICATE OF CORRECTION

PATENT NO. : 5,382,773

DATED : January 17, 1995

INVENTOR(S) : Kazuhiko Kurihara, et al

It is certified that error appears in the above-indentified patent and that said Letters Patent is hereby corrected as shown below:

Sheet 3 of 19 showing Figure 3 should be deleted to appear as per attached sheet 3 of 19 consisting of Figures 4, 5 & 6.

Signed and Sealed this

Twentieth Day of June, 1995

Attest:

BRUCE LEHMAN

Attesting Officer Commissioner of Patents and Trademarks